(12) United States Patent
Uno et al.

(10) Patent No.: US 6,660,789 B2
(45) Date of Patent: Dec. 9, 2003

(54) POLYESTER RESIN COMPOSITION AND MOLDING PRODUCT THEREOF

(75) Inventors: Tomoyuki Uno, Nagoya (JP); Takashi Sugata, Obu (JP); Akira Hirai, Tokyo (JP); Tetsuya Hirose, Kariya (JP); Hiroyuki Yamazaki, Aichi-ken (JP); Kazuo Kato, Nagoya (JP)

(73) Assignees: Toray Industries, Inc., Tokyo (JP); Denso Corporation, Aichi-Ken (JP)

( * ) Notice: Subject to any disclaimer, the term of this patent is extended or adjusted under 35 U.S.C. 154(b) by 0 days.

(21) Appl. No.: 10/101,691

(22) Filed: Mar. 21, 2002

(65) Prior Publication Data

US 2002/0188073 A1 Dec. 12, 2002

(30) Foreign Application Priority Data

Mar. 28, 2001 (JP) ........................................ 2001-092608
Sep. 28, 2001 (JP) ........................................ 2001-302092

(51) Int. Cl.$^7$ .............................................. C08L 67/02
(52) U.S. Cl. ...................... 524/269; 524/267; 524/504; 524/505; 524/508; 525/67; 525/92 E; 525/101; 525/133; 525/439; 525/448

(58) Field of Search .................................. 524/504, 505, 524/508, 267, 269; 525/67, 92 E, 133, 439, 101

(56) References Cited

U.S. PATENT DOCUMENTS 4,476,274 A * 10/1984 Liu .............................. 524/445
6,447,913 B1 * 9/2002 Watanabe .................... 428/413

FOREIGN PATENT DOCUMENTS

WO 00/78867 * 12/2000

* cited by examiner

Primary Examiner—Patricia A. Short
(74) Attorney, Agent, or Firm—Rader Fishman & Grauer

(57) ABSTRACT

A polyester composition comprising (A) 30 to 95 parts by weight of a polybutylene terephthalate resin containing a polybutylene terephthalate-isophthalate copolymer in which the content of an isophthalic acid ingredient to the entire dicarboxylic acid ingredient is 5 to 20 mol %, (B) 1 to 30 parts by weight of a polycarbonate resin, (C) 3 to 20 parts by weight of an elastomer and (D) 15 to 30 parts by weight of a fibrous reinforcing material, and (E) 0.1 to 3 parts by weight of a silicone compound, wherein the total amount for (A)–(D) is 100 parts by weight, the composition being used for insert molding.

13 Claims, 1 Drawing Sheet

POLYESTER RESIN COMPOSITION AND MOLDING PRODUCT THEREOF

BACKGROUND OF THE INVENTION

This invention concerns a polyester resin composition and a molding product thereof and, more in particular, it relates to a polyester resin composition excellent in chemical resistance, particularly, resistance to alkaline solutions and also excellent in mechanical strength, and a molding product formed by metal insert molding of the resin composition.

Since, thermoplastic polyester resins, among all, polybutylene terephthalate resins have properties suitable as engineering plastics such as excellent heat resistance, moldability, chemical resistance and electric insulation property, they have been used mainly for injection molding in application uses such as various kinds of automobile components, electric components, mechanical components and building components.

However, since the impact strength and the dimensional accuracy can not be said satisfactory in polybutylene terephthalate resin by itself, it has been known to blend a polybutylene terephthalate resin with a polycarbonate resin as one of countermeasures to the problem.

A thermoplastic resin composition formed by blending the thermoplastic polyester resin and the polycarbonate resin is provided with such characteristics as impact resistance, heat resistance and chemical resistance, as well as improved surface appearance and the welding strength of the molding product by further blending a methacrylate resin and an alkyl acrylate/alkyl methacrylate copolymer as described in, for example, Japanese Patent Laid-Open No. 298422/1998.

Further, Japanese Patent Laid-Open No. 2000-291973 discloses a resin composition formed by blending a polycarbonate resin and a polyester resin for which production process and kind are specified. According to the Publication, it is described that the resin composition possesses inherent characteristics such as chemical resistance of both of the resins and is also excellent in the resistance to wet heat fatigue.

Japanese Patent Laid-Open No. 291204/1997 describes a resin composition formed by blending a polyester copolymer obtained from a dicarboxylic acid mainly comprises terephthalic acid and 1,4-butanediol, with polycarbonate resin, nuclear agent, inorganic filler and coloring ingredient. It is described that the composition has high mechanical strength and rigidity, as well as enhanced appearance of the molding product.

By the way, some molding products of thermoplastic polyester resin compositions are used under circumstances liable to undergo external effects such as some of car electronic components and cement-buried components. One of possibly significant problems for such molding products can include contact with rain fall or snow melt, which is rendered alkaline by some or other reasons or contact with those which are alkaline by nature such as cement. That is, when a thermoplastic polyester resin is kept in contact with an alkaline solution, it results in a problem that the mechanical strength is greatly deteriorated. Further, in a molding product formed by insert molding of a metal involves a problem that cracks are formed due to the difference in the linear expansion coefficient between the inserted metal and the resin reduced with the mechanical strength with the change of the environmental temperature. Particularly, the strength during immersion in the alkaline solution is remarkable in fibrous reinforcing material-containing products and, although they are reinforced with fibrous reinforcing material, the strength is sometimes lowered more than in the case of non-reinforced products not containing fibrous reinforcing materials.

The present inventors have made an earnest study for improving the resistance to an alkaline solution (hereinafter referred to as an alkali resistance) of a thermoplastic resin composition containing a fibrous reinforcing material and, as a result, have found that a composition comprising a polybutylene terephthalate resin containing polybutylene terephthalate/isophthalate copolymer, a polycarbonate resin, an elastomer and a fibrous reinforcing material is excellent, particularly, in view of the alkali resistance and have accomplished this invention to be described specifically later.

When this invention is compared with that in known literatures described above, it has been found that the combination of the polyester copolymer with the polycarbonate resin and the inorganic filler as described in the examples of Japanese Patent Laid-Open No. 291204/1997 can not suppress the occurrence of cracks due to the difference in the linear expansion coefficient between the inserted metal and the resin since the elastomer is not added.

On the other hand, while Japanese Patent Laid-Open No. 2000-119492 and 298422/1998 describe combinations of the polyester resin with the polycarbonate resin, inorganic filler and elastomer, what are disclosed specifically are combination of polybutylene terephthalate resin, polycarbonate resin, inorganic filler and elastomer, or a combination using a polyethylene terephthalate resin instead of the polybutylene terephthalate resin. In this case, although the ratio of an amorphous portion is large in average for the entire resin, since polyester resin itself is present locally, it can not prevent the lowering of the reinforcing effect by the fibrous reinforcing material.

SUMMARY OF THE INVENTION

This invention intends to provide a polyester resin composition excellent in an alkali resistance and also excellent in a mechanical strength, as well as an insert molding product using the composition.

For solving the subject described above, the invention comprises the following constitution:

1. A polyester resin composition comprising
   (A) 30 to 95 parts by weight of a polybutylene terephthalate resin containing a polybutylene terephthalate-isophthalate copolymer in which the content of an isophthalic acid ingredient to the entire dicarboxylic acid ingredient is 3 to 30 mol %,
   (B) 1 to 30 parts by weight of a polycarbonate resin,
   (C) 1 to 30 parts by weight of an elastomer and
   (D) 3 to 60 parts by weight of a fibrous reinforcing material, wherein the total amount for (A)–(D) is 100 parts by weight.
2. A polyester resin composition as defined in (1) above, wherein (E) 0.1 to 5 parts by weight of a silicone compound is added and blended based on 100 parts by weight of the total amount for (A)–(D).
3. A polyester resin composition as defined in (2) above, wherein the silicone compound (E) is a dimethyl silicone oil having a viscosity as measured at 25° C. of 10,000 mm$^2$/s or less and containing 1,000 ppm or less of a low molecular weight siloxane with a molecular weight of 800 or less.
4. A polyester resin composition as defined in any one of (1) to (3) above, wherein the elastomer (C) is an ethylenic copolymer formed by copolymerizing ethylene with one or more of an α-olefin of 3 or more carbon atoms, an α,β unsaturated acid and an alkyl ester thereof.

5. A polyester resin composition as defined in any one of (1) to (4) above, wherein the fibrous reinforcing material (D) is one of glass fiber and wollastonite.

6. A polyester resin composition as defined in any one of (1) to (5) above, which is used for insert molding.

7. An insert molding product comprising the polyester resin composition as defined in any one of (1) to (5) above.

As described above, since the polyester resin composition contains specified polybutylene terephthalate resin, polycarbonate resin, elastomer and fibrous reinforcing material each at a specified ratio, a polyester resin composition excellent in resistance to alkaline solutions and also excellent in mechanical strength can be obtained.

Further, an insert molding product excellent in alkali resistance and mechanical strength can be obtained from the polyester resin composition by insert molding of a metal.

DESCRIPTION OF THE PREFERRED EMBODIMENTS

Figure 1:
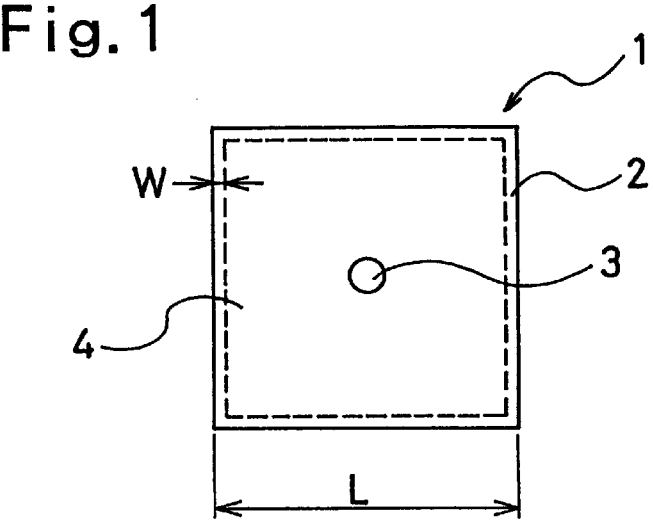
FIG. 1 is a plan view of an insert molding product used for the evaluation of alkali resistance of a polyester resin composition.

The polybutylene terephthalate/isophthalate copolymer used in this invention is a copolymer of terephthalic acid, isophthalic acid, and 1,4-butanediol, which is obtained by polycondensation of terephthalic acid or an ester-forming derivative thereof, isophthalic acid or an ester-forming derivative thereof, and 1,4-butanediol or an ester-forming derivative thereof by a usually known method. The content of the isophthalic acid ingredient in the entire dicarboxylic acid ingredient in the polybutylene terephthalate/isophthalate copolymer (hereinafter referred to as isophthalic acid content) is 3 to 30 mol %. Preferably, it is 3 to 20 mol % in view of the balance between the alkali resistance and the moldability. When the isophthalic acid content is less than 3 mol %, the alkali resistance is insufficient, failing to attain the object of the invention. On the other hand, if it exceeds 30 mol %, it is not preferred since the moldability is lowered.

The polybutylene terephthalate resin (A) referred to in this invention (hereinafter also referred to as ingredient (A)) may be the polybutylene terephthalate/isophthalate copolymer alone, a mixture of a polybutylene terephthalate resin and the polybutylene terephthalate/isophthalate copolymer or may be a mixture of two kinds of polybutylene terephthalate/isophthalate copolymers of different isophthalic acid content. In any of the cases, it may suffice that the isophthalic acid content in the ingredient (A) is within an identical range with the isophthalic acid content of the polybutylene terepbthalate/isophthalate copolymer.

The viscosity for the ingredient (A) has no particular restriction so long as melt kneading is possible and it is generally preferred that the intrinsic viscosity is from 0.36 to 1.60 as measured in o-chlorophenol solution at 25° C. A more preferred range of the intrinsic viscosity is 0.52 to 1.35 and, further preferably, 0.60 to 1.10. When the ingredient (A) comprises two or more of ingredients, it may suffice that the result for the measurement of the viscosity is within the condition for the viscosity described above by preparing the o-chlorophenol solution after pulverization or in the state of the pellet as it is so as not to change the ingredient ratio.

The addition and blending amount of the ingredient (A) is 30 to 95 parts by weight and, preferably, 35 to 85 parts by weight based on 100 parts by weight of the total for the four ingredients of the ingredient (A), the polycarbonate resin (B) (hereinafter also referred to as ingredient (B)), the elastomer (C) (hereinafter also referred to as the ingredient (C)), and fibrous reinforcing material (D) (hereinafter also referred to as ingredient (D)). When the addition and blending amount of the ingredient (A) is less than 30 parts by weight, the content for the ingredients (B)–(D) is relatively increased excessively to lower the moldability. On the other hand, when it exceeds 95 parts by weight, the content for the ingredients (B)–(D) is relatively lowered excessively and the alkali resistance and the mechanical resistance are deteriorated.

The ingredient (B) used in this invention can include, for example, those obtained by reacting an aromatic dihydroxy compound, phosgene or diester carbonate, or those obtained by the reaction of the starting materials described above in the presence of a small amount of a branching agent.

The aromatic dihydroxy compound usable herein can include, for example, 2,2-bis(4-hydroxydiphenyl) propane, 2,2-bis(4-hydroxy-3,5-dimethylphenyl) propane, bis(4-hydroxyphenyl) methane, 1,1-bis(4-hydroxyphenyl) ethane, 2,2-bis(4-hydroxyphenyl) butane, 2,2-bis(4-hydroxy-3,5-dimethylphenyl) butane 1,1-bis(4-hydroxyphenyl) cyclohexane, and 1-phenyl-1,1-bis(4-hydroxyphenyl) ethane, which may be used alone or as a mixture of two or more of them.

The viscosity average molecular weight of the ingredient (B) is desirably within a range from 10,000 to 1,000,000. So long as the viscosity average molecular weight is within the range described above, two or more of different polycarbonate resin may be used together.

The addition and blending amount of the ingredient (B) is desirably within a range from 1 to 30 parts by weight, more preferably, 2 to 20 parts by weight and, further preferably, 3 to 20 parts by weight based on 100 parts by weight of the total amount for the ingredients (A)–(D), in view of the balance between the alkali resistance and the fluidity.

The ingredient (C) used in this invention can include olefin, butadiene, polyester, polyamide or silicone elastomers, preferably olefin elastomer among them, and more preferably, an ethylenic copolymer formed by copolymerizing ethylene and one or more of comonomers selected from α-olefin of 3 or more carbon atoms or α,β unsaturated acid and an alkyl ester thereof. The ethylenic copolymer described above further graft polymerized with an unsaturated carboxylic acid glycidyl ester is most preferred in view of the improvement of the dispersibility of the elastomer.

The ethylenic copolymer can specifically include, for example, ethylene/propylene copolymer, ethylene/1-butene copolymer, ethylene/pentene copolymer, ethylene-octene copolymer, ethylene/(meth)acrylate copolymer, ethylene/methyl(meth)acrylate copolymer, ethylene/ethyl(meth) acrylate copolymer, ethylene/butyl(meth)acrylate copolymer, and ethylene/methyl acrylate/glycidyl methacrylate copolymer. Such elastomers may be used alone or two or more of them may be used together.

The addition and blending amount of the ingredient (C) used in this invention is within a range from 1 to 30 parts by weight and, more preferably, within a range from 2 to 20 parts by weight based on 100 parts by weight of the total amount for the ingredients (A)–(D) in view of the balance for the alkali resistance, the mechanical strength and the moldability.

The fibrous reinforcing material (D) of this invention (hereinafter referred to as ingredient (D)) can include, for example, glass fibers, wollastonite, potassium titanate whiskers, zinc oxide whiskers, carbon fibers, alumina fibers, silicon carbide fibers, ceramic fibers, asbestos fibers, gypsum fibers and metal fibers, preferred example including glass fibers and wollastonite.

Further, use of such fibrous filler after pre-treatment with a silane, epoxy or titanate coupling agent is further preferred in view of the mechanical strength or the like.

The addition and blending amount of the ingredient (D) used in this invention is within a range from 3 to 60 parts by weight and, more preferably, within a range from 10 to 40 parts by weight based on 100 parts by weight of the total amount for the ingredients (A)–(D) in view of the balance between the fluidity and the mechanical strength.

Further, with an aim of improving the dimensional stability of a molding product, non-fibrous filling material may be used together. The non-fibrous filler can include, for example, silicates such as zeolite, celisite, kaoline, mica, clay, bentonite, asbestos, talc and alumina silicate, metal compounds such as alumina, silicon oxide, magnesium oxide, zirconium oxide, titanium oxide and iron oxide, carbonates such as calcium carbonate, magnesium carbonate and dolomite, sulfates such as calcium sulfate and barium sulfate, glass flakes, glass beads, ceramic beads, boron nitride, silicon carbide and silica.

In this invention, the alkali resistance can further be improved by adding and blending the silicone compound (E) (hereinafter referred to as ingredient (E)). The silicone compound used herein is a polyorgano siloxane comprising a unit represented by the following general formulae (1)–(4) and a chemically bonded siloxane unit selected from the mixture thereof (where R represents a group selected from saturated or unsaturated monovalent hydrocarbon, hydrogen atom, hydroxyl group, alkoxyl group, aryl group, vinyl or allyl group). Among the silicone compounds described above, a dimethyl silicone oil is preferred. Further preferred is a dimethyl silicone oil having a viscosity of 10,000 mm²/s or less as measured at 25° C. according to JIS Z 8803.

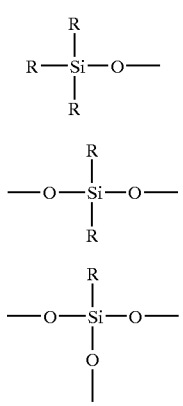

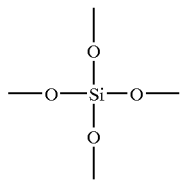

Further, for preventing contact troubles in a case of applying the resin composition according to this invention to electronic components, the dimethyl silicone oil is preferably a dimethyl silicone oil containing 1,000 ppm or less of a low molecular weight siloxane having a molecular weight of 800 or less. Dimethyl silicone oils satisfying the conditions described above are marketed and available.

The addition and blending amount in a case of blending the silicone compound is preferably within a range from 0.1 to 5 parts by weight based on 100 parts by weight of the total amount for the ingredient (A)–ingredient (D) in view of the balance between the alkali resistance and the mechanical strength. It is further preferably from 0.1 to 3 parts by weight.

In the polyester resin composition according to this invention, usual additives such as releasing agent, anti-oxidant, stabilizer, lubricant, nucleating agent, UV-ray absorbent, colorant and flame retardant, as well as a small amount of other kind of polymer may be added within such a range as not deteriorating the effect of the invention.

For example, the releasing agent can include, for example, montanic acid waxes, metal soaps such as lithium stearate and aluminum stearate, higher fatty acid amides such as ethylene bisstearyl amide, and ethylenediamine—stearic acid—sebacic acid polycondensation product.

The anti-oxidant can include, for example, phenolic compounds such as 2,6-di-t-butyl-4-methyl phenol, tetrakis (methylene-3-(3,5-di-t-butyl-4-hydroxyphenyl) propionate) methane, tris(3,5-di-t-butyl-4-hydroxybenzyl) isocyanurate, sulfur compounds such as dilauryl-3,3'-thiodipropionate, and dimyristyl-3,3'-thiodipropionate, and phosphoric compounds such as trisnonylphenyl phosphite and di-stearyl pentaerythrytol diphosphite.

The stabilizer can include, for example, benzotriazol compounds including 2-(2'-hydroxy-5'-methylphenyl) benzotriazole, benzophenone compounds such as 2,4-dihydroxybenzophenone, and phosphate esters such as mono- or di-stearyl phosphate and trimethyl phosphate.

Further, the nucleating agent can include, for example, polyether ether ketone resin and talc.

Each of the additives described above may be used in combination since combination of two or more of them can sometimes provide a synergistic effect.

Further, the additive mentioned as the example of the anti-oxidant may sometimes act as the stabilizer or the UV-ray absorbent. Further, some of the examples of the stabilizer have an anti-oxidant effect or UV-ray absorbing effect. That is, the category described above is merely for the sake of conveniency and does not restrict the function.

The process for producing the polyester resin composition according to this invention may be practiced by a usually known method with no particular restriction. Typical example, can include, for example, a method of melt kneading at a temperature of 200 to 350° C. by using a known melt kneading machine such as a single screw or double-screw extruder, a banbury mixer, a kneader or mixing roll. Each of the ingredients may previously mixed collectively from which melt kneading may be conducted. Alternatively, a small amount of additive ingredients, for example, to be added by 1 part by weight or less based on 100 parts by weight of the total amount for the ingredients (A)–(D) may be added after kneading and pelleting other ingredients by the method described above and before molding of the same. Further, the content of water deposited to each of the ingredients is preferably as low as possible and it is desired that the ingredients may be dried previously. However, it is not always necessary to dry all of the ingredients.

An example of the preferred production process can include a method of using a double-screw extruder at a cylinder temperature of 230 to 300° C., and supplying and kneading those ingredients other than the ingredient (D) from the upstream of the extruder, then supplying the ingredient (D) from the side and then further kneading them.

The resin composition according to this invention is molded generally by a known method of molding thermoplastic resin such as injection molding, extrusion molding, blow molding, transfer molding and vacuum forming, with the injection molding being particularly preferred.

The polyester resin composition according to this invention is a resin composition excellent in the alkali resistance and the mechanical strength and is useful as molding products by insert molding of metals, car mounted components and molding products used being buried in cement while taking advantage of such characteristics.

Specific applications for use can include car electronic equipment such as solenoid valves, sensors, engine control units and ignition coils, as well as building components for example, cement joining jigs.

EXAMPLE

This invention is to be explained further in details with reference to examples.

Blend compositions used in examples and comparative examples are shown.

(1) A-0: polybutylene terephthalate resin, intrinsic viscosity: 0.81 dl/g
(2) A-1-1: polybutylene terephthalate/isophthalate copolymer
  (a) composition: terephthalic acid/isophthalic acid: 85/15 mol %
  (b) polymerization method for A-1-1
  425 parts of terephthalic acid (hereinafter also referred to as TPA), 75 parts of isophthalic acid (hereinafter also referred to as IPA) [TPA/IPA=85/15 mol %], 407 parts of 1,4-butanediol, and 1 part of tetra-n-butyl titanate were charged in a reactor equipped with a rectifier column and they were reacted at an esterifying reaction ratio of 95% or higher under a reduced pressure of 500 mmHg while gradually elevating the temperature from 180° C. to 230° C., then the temperature was elevated to 240° C. and pressure was reduced down to 0.5 mmHg and polymerization was completed after 3 hours and 30 min. The intrinsic viscosity of the resultant copolymer was 0.80 dl/g.
(3) A-1-2: polybutylene terephthalate/isophthalate copolymer
  (a) terephthalic acid/isophthalic acid: 65/35 mol %
  (b) polymerization process for A-1-2
  Polymerization was conducted in the same method as in A-1-1 except for changing the charging amount to 325 parts of terephthalic acid (TPA) and 175 parts of isophthalic acid (IPA) [TPA/IPA=65/35 mol %]. The intrinsic viscosity of the copolymer was 0.81 dl/g.
(4) A-1-3: polybutylene terephthalate/isophthalate copolymer
  (a) terephthalic acid/isophthalic acid: 90/10 mol %
  (b) polymerization process for A-1-3
  Polymerization was conducted in the same method as in A-1-1 except for changing the charging amount to 450 parts of terephthalic acid (TPA) and 50 parts of isophthalic acid (IPA) [TPA/IPA=90/10 mol %]. The intrinsic viscosity of the copolymer was 0.81 dl/g.
(5) A-2: polybutylene terephthalate/dodecadicarboxylate copolymer
  (a) terephthalic acid/dodecadionic acid: 85/15 mol %
  (b) polymerization process for A-2
  Polymerization was conducted in the same method as in A-1-1 except for changing the charging amount to 425 parts of terephthalic acid (TPA) and 117 parts of dodecadionic acid (hereinafter also referred to as DDA) [TPA/DDA=85/15 mol %]. The intrinsic viscosity of the copolymer was 0.80 dl/g.
(6) B-1: polycarbonate resin (viscosity average molecular weight: 19000)
(7) C-1-1: ethylene/methyl acrylate/glycidyl methacrylate copolymer
  The weight ratio for each of the ingredients: 64/30/6 wt %. MFR=9 g/10 min (measuring method: JIS-K6760 (190° C., 2160 g)).
(8) C-1-2: ethylene/ethyl acrylate copolymer
  Weight ratio for both ingredients: 65/35 wt %. MFR=25 g/10 min (measuring method; JIS-K6760 (190° C., 2160 g)).
(9) D-1: glass fiber (chopped strand: average fiber diameter 10 μm)
(10) D-2: fused silica (average grain size 7 μm)
(11) E-1: silicone
  (viscosity: 300 cs. Content for the ingredient with molecular weight of 800 or less, 250 ppm)
  (viscosity measuring method: JIS Z8803 (25° C.))
(12) F-1: releasing agent (ethylenebisstearyl amide)
Evaluation methods for examples and comparative examples are shown below.

(1) Alkali Resistance Evaluation—1

An ASTM No. 1 weld test piece having gates are disposed on both ends and a weld formed at the center was molded under the conditions at a cylinder temperature of 260° C. and a die temperature of 80° C.

After annealing the test piece at 130° C. for 3 hours, and immersing in an aqueous 10 wt % solution of sodium hydroxide at a normal temperature for 100 hours, the tensile strength was determined according to ASTM D 638 and the strength retention ratio of the immersed product relative to not-immersed product was used as an index for the alkali resistance.

(2) Alkali Resistance Evaluation—2

Figure 2:
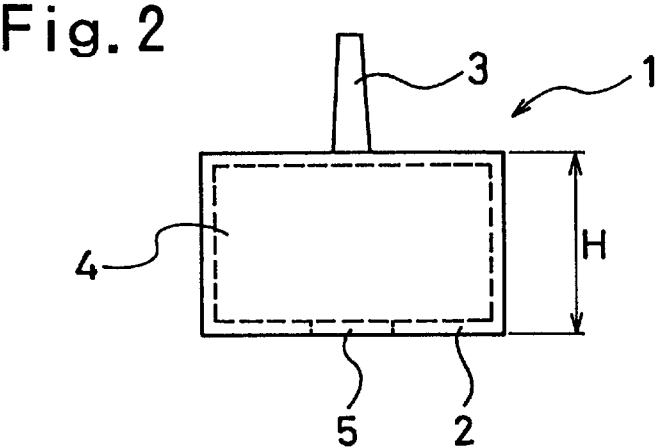
FIG. 2 is a side elevational view of the insert molding product.

An insert molding product 1, as shown in FIGS. 1 and 2, formed of a cylindrical post of a square transversal cross sectional shape and a sprue 3 of a conical shape having a circular bottom with the center being situated at the intersection of diagonal lines on the upper surface of the cylindrical post, cut at the top of the cone in parallel with the bottom thereof and disposed to the upper surface of the square cylindrical post was molded under the conditions at a cylinder temperature of 260° C. and a mold temperature of 80° C.

The insert molding product 1 was formed by attaching an insert metal 4 to a mold, injecting a resin from an injection molding machine, filling the injected resin into the molding cavity so as to cover from the sprue 3 as far as the insert metal 4 and then solidifying the resin 2 and the sprue 3.

Since the resin does not flow into a portion where the metal and the molding die are in contact with each other by the disposition of the insert metal to the mold, a not resin filled portion corresponding to the contact portion was formed at the bottom of the insert molding product 1.

The length L for the side of the cylindrical square post is 50 mm and the height H is 30 mm in the insert molding product 1, and the thickness W of the resin 2 is 1.5 mm.

After annealing the molding product at 130° C. for 3 hours, it was immersed in an aqueous 10 wt % solution of sodium hydroxide, and the appearance of the molding product was visually observed on every 24 hours. A time subtracting 12 hours from the time at which cracking of the insert molding product could be confirmed was defined as an alkali cracking occurrence time.

(3) Mechanical Strength Evaluation—1 (Tensile Strength)

An ASTM No. 1 test piece was molded under the condition at a cylinder temperature of 260° C. and a mold temperature of 80° C. and used as a specimen. The tensile strength was determined according to ASTM D638.

(4) Mechanical Strength Evaluation—2 (Notched Izod Impact Strength)

Evaluation was conducted by the method according to ASTM D256. The test piece width was 6.4 mm and the molding condition was at a cylinder temperature of 260° C. and the mold temperature of 80° C. After machining the notch, the Izod impact strength was determined.

(5) Moldability Evaluation

When molding the weld test piece conducted in (1), those in which the weld part was flexed and the test piece was deformed upon ejecting the molding product was indicated by "X" as poor moldability in the table. On the other hand those with no deformation was indicated by "O" in the table.

Examples 1–10

Ingredient (A) to ingredient (E) were blended by the combination shown in Table 1. Further, the releasing agent F-1 was added in all examples, but not described in Table 1. The addition amount of F-1 was 0.3 parts by weight based on 100 parts by weight of the total amount for the ingredients (A)–(D).

The method of manufacturing the materials described in each of the examples is as shown below. That is, they were manufactured by using a double-screw extruder having 57 mmφ screw diameter and set to a cylinder temperature of 250° C. Melt kneading was conducted by supplying the ingredient (A) (polyester resin), ingredient (B) (polycarbonate resin), ingredient (C) (elastomer), ingredient (E) (silicone) and other additives from a main charging portion and supplying the ingredient (D) (fibrous reinforcing material) from a side feeder. After cooling a strand discharged from a dice in a cooling bath, it was pelleted by a strand cutter. After drying each of the obtained materials by a hot blow drier at 130° C. for 3 hours or more, they were molded by using the method as described in the evaluation method above and evaluated. The results are also shown in Table 1. Any of the resultant compositions had high alkali resistance and mechanical strength and the moldability was also favorable.

Comparative Example

Comparative Examples 1 to 12 are to be explained and the blending formulation and the result of evaluation in the comparative examples are shown in Table 2 and Table 3. In each of the comparative examples, F-1 was blended but not shown in the tables.

Comparative Examples 1, 2

In Comparative Example 1, 0.3 parts by weight of F-1 was added to 100 parts by weight of A-0 (polybutylene terephthalate resin) and manufactured and evaluated in the same method as in the examples. Further, in Comparative Example 2, 30 parts by weight of D-1 (glass fiber) and 0.3 parts by weight of F-1 were blended to 70 parts by weight of A-0 and manufactured and evaluated in the same manner. As a result, Comparative Example 1 was poor both in the alkali resistance and the mechanical strength. Further, while Comparative Example 2 had preferable mechanical strength but was poor in the alkali resistance and could not be used for the application use to intended for the purpose.

Comparative Example 3

30 parts by weight of D-2 (fused silica) and 0.3 parts by weight of F-1 were blended to 70 parts by weight of A-0 (polybutylene terephthalate resin) and manufactured and evaluated in the same manner as in examples. As a result both of the mechanical strength and the alkali resistance were poor.

Comparative Example 4

5 parts by weight of B-1 (polycarbonate resin), 4 parts by weight of C-1-1 (ethylene/methyl acrylate/glycidyl methacrylate copolymer), 3 parts by weight of C-1-2 (ethylene/ethyl acrylate copolymer), 30 parts by weight of D-1 (glass fiber), 1 part by weight of E-1 (silicone) and 0.3 parts by weight of F-1 were blended with 58 parts by weight of A-0 (polybutylene terephthalate resin) and manufactured and evaluated in the same manner as in the examples. While there were no problems in view of the mechanical strength and the moldability, the alkali resistance was insufficient.

Comparative Example 5

5 parts by weight of B-1 (polycarbonate resin), 10 parts by weight of C-1-1 (ethylene/methyl acrylate/glycidyl methacrylate copolymer) and 0.3 parts by weight of F-1 were blended with 85 parts by weight of A-0 (polybutylene terephthalate resin) and manufactured and evaluated in the same manner as in the examples. The mechanical strength and the alkali resistance were insufficient.

Comparative Example 6

30 parts by weight of D-1 (glass fiber) and 0.3 parts by weight of F-1 were blended with 70 parts by weight of A-1-1 (polybutylene terephthalate/isophthalate copolymer, isophthalic acid content: 15 mol %), and manufactured and evaluated in the same manner as in the examples. The alkali resistance was insufficient.

Comparative Examples 7, 8

In Comparative Example 7, 5 parts by weight of B-1 (polycarbonate resin), 30 parts by weight of D-1 (glass fiber) and 0.3 parts by weight of F-1 were added to 65 parts by weight of A-1-1 (polybutylene terephthalate/isophthalate copolymer: isophthalic acid content: 15 mol %), and manufactured and evaluated in the same manner as in the examples. In Comparative Example 8, 35 parts by weight of A-1-1 (polybutylene terephthalate/isophthalate copolymer, isophthalic acid content: 15 mol %), 35 parts by weight of B-1 (polycarbonate resin), 30 parts by weight of D-1 (glass fiber) and 0.3 parts by weight of F-1 were blended and manufactured and evaluated in the same manner as in the examples. As a result, the alkali resistance was insufficient in Comparative Example 7 and no test piece could be sampled in Comparative Example 8 since the moldability was poor.

Comparative Example 9

10 parts by weight of C-1-1 (ethylene/methyl acrylate/glycidyl methacrylate copolymer), 30 parts by weight of D-1 (glass fiber) and 0.3 parts by weight of F-1 were added to 60 parts by weight of A-1-1 (polybutylene terephthalate/isophthalate copolymer, isophthalic acid content: 15 mol %), and manufactured and evaluated in the same manner as in examples. As a result, the alkali resistance was insufficient.

Comparative Example 10

35 parts by weight of C-1-1 (ethylene/methyl acrylate/glycidyl methacrylate copolymer), 30 parts by weight of D-1 (glass fiber), and 0.3 parts by weight of F-1 were blended with 35 parts by weight of A-1-1 (polybutylene terephthalate/isophthalate copolymer, isophthalic acid content: 15 mol %), and manufactured and evaluated in the same manner as in the examples. As a result, no test piece could be collected since the moldability was poor.

Comparative Example 11

55 parts by weight of A-1-2 (polybutylene terephthalate/isophthalate copolymer, isophthalic acid content: 35 mol %), 5 parts by weight of B-1 (polycarbonate resin), 10 parts by weight of C-1-1 (ethylene/methyl acrylate/glycidyl methacrylate copolymer), 30 parts by weight of D-1 (glass fiber) and 0.3 parts by weight of F-1 were blended. As a result of evaluation, the moldability was poor and the test piece could not be sampled.

Comparative Example 12

55 parts by weight of A-2 (polybutylene terephthalate/dodecadicarboxylate copolymer), 5 parts by weight of B-1 (polycarbonate resin), 10 parts by weight of C-1-1 (ethylene/methyl acrylate/glycidyl methacrylate copolymer), 30 parts by weight of D-1 (glass fiber) and 0.3 parts by weight of F-1 were blended. As a result of evaluation, the alkali resistance was not satisfactory.

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| A-0 | parts by weight | — | 36.7 | — | — | — | 38.6 | — | — | — | 28.7 |
| A-1-1 | parts by weight | 55 | 18.3 | 55 | 58 | 73 | — | 44 | 58 | — | — |
| A-1-2 | parts by weight | — | — | — | — | — | 6.4 | 15 | — | — | — |
| A-1-3 | parts by weight | — | — | — | — | — | — | — | — | 58 | 28.7 |
| Copolymer ingredient content | mol % | 15 | 5 | 15 | 15 | 15 | 5 | 20 | 15 | 10 | 5 |
| B-1 | parts by weight | 5 | 5 | 5 | 5 | 5 | 20 | 3 | 2 | 5 | 2.5 |
| C-1-1 | parts by weight | 10 | 10 | 5 | 4 | 4 | 5 | 8 | 5 | 2.3 | 3.3 |
| C-1-2 | parts by weight | — | — | 5 | 3 | 3 | — | — | 5 | 4.7 | 6.8 |
| D-1 | parts by weight | 30 | 30 | 30 | 30 | 15 | 30 | 30 | 30 | 30 | 30 |
| E-1 | parts by weight | — | — | — | 1 | 1 | — | — | 1 | 1 | 1 |
| Alkali resistance-1 | % | 98 | 97 | 98 | 97 | 95 | 98 | 98 | 98 | 98 | 98 |
| Alkali resistance-2 | hr | 108 | 84 | 132 | 204 | 108 | 84 | 108 | 240 | 220 | 210 |
| Tensile strength | MPa | 118 | 120 | 117 | 117 | 99 | 133 | 118 | 116 | 122 | 114 |
| Notched Izod impact strength | J/m | 170 | 163 | 161 | 151 | 93 | 145 | 159 | 158 | 135 | 151 |
| Moldability | — | ◯ | ◯ | ◯ | ◯ | ◯ | ◯ | ◯ | ◯ | ◯ | ◯ |

TABLE 2

| | | Comp. Example 1 | Comp. Example 2 | Comp. Example 3 | Comp. Example 4 | Comp. Example 5 | Comp. Example 6 | Comp. Example 7 | Comp. Example 8 |
|---|---|---|---|---|---|---|---|---|---|
| A-0 | parts by weight | 100 | 70 | 70 | 58 | 85 | — | — | — |
| A-1-1 | parts by weight | — | — | — | — | — | 70 | 65 | 35 |
| A-1-2 | parts by weight | — | — | — | — | — | — | — | — |
| A-2 | parts by weight | — | — | — | — | — | — | — | — |
| Copolymer ingredient content | mol % | — | — | — | — | — | 15 | 15 | 15 |
| B-1 | parts by weight | — | — | — | 5 | 5 | — | 5 | 35 |

TABLE 2-continued

|  |  | Comp. Example 1 | Comp. Example 2 | Comp. Example 3 | Comp. Example 4 | Comp. Example 5 | Comp. Example 6 | Comp. Example 7 | Comp. Example 8 |
|---|---|---|---|---|---|---|---|---|---|
| C-1-1 | parts by weight | — | — | — | 4 | 10 | — | — | — |
| C-1-2 | parts by weight | — | — | — | 3 | — | — | — | — |
| D-1 | parts by weight | — | 30 | — | 30 | — | 30 | 30 | 30 |
| D-2 | parts by weight | — | — | 30 | — | — | — | — | — |
| E-1 | parts by weight | — | — | — | 1 | — | — | — | — |
| Alkali resistance-1 | % | 93 | 20 | 96 | 63 | 95 | 21 | 26 | — |
| Alkali resistance-2 | hr | 12 | 12 | 12 | 60 | 12 | 12 | 12 | — |
| Tensile strength | MPa | 57 | 135 | 63 | 115 | 44 | 133 | 131 | — |
| Notched Izod impact strength | J/m | 25 | 65 | 27 | 165 | 93 | 68 | 69 | — |
| Moldability | — | — | ○ | ○ | ○ | ○ | ○ | ○ | X |

TABLE 3

|  |  | Comp. Example 9 | Comp. Example 10 | Comp. Example 11 | Comp. Example 12 |
|---|---|---|---|---|---|
| A-0 | parts by weight | — | — | — | — |
| A-1-1 | parts by weight | 60 | 35 | — | — |
| A-1-2 | parts by weight | — | — | 55 | — |
| A-2 | parts by weight | — | — | — | 55 |
| Copolymer ingredient content | mol % | 15 | 15 | 35 | 15 |
| B-1 | parts by weight | — | — | 5 | 5 |
| C-1-1 | parts by weight | 10 | 35 | 10 | 10 |
| C-1-2 | parts by weight | — | — | — | — |
| D-1 | parts by weight | 30 | 30 | 30 | 30 |
| D-2 | parts by weight | — | — | — | — |
| E-1 | parts by weight | — | — | — | — |
| Alkali resistance-1 | % | 97 | — | — | 31 |
| Alkali resistance-2 | hr | 12 | — | — | 12 |
| Tensile strength | MPa | 119 | — | — | 81 |
| Notched Izod impact strength | J/m | 170 | — | — | 173 |
| Moldability | — | O | X | X | O |

As has been described above, the polyester resin composition according to this invention has excellent characteristics in the alkali resistance and the mechanical strength. Accordingly, it is useful as molding products by metal insert molding, car mounted components, and molding products used being buried in cement.

What is claimed is:

1. A polyester resin composition comprising
   (A) 30 to 95 parts by weight of a polybutylene terephthalate type resin containing a polybutylene terephthalate-isophthalate copolymer in which the content of an isophthalic acid ingredient to the entire dicarboxylic acid ingredient is 5 to 20 mol %,
   (B) 1 to 30 parts by weight of a polycarbonate resin,
   (C) 2 to 20 parts by weight of an elastomer,
   (D) 15 to 30 parts by weight of a fibrous reinforcing material, and
   (E) 0.1 to 3 parts by weight of a silicone compound added and blended based on 100 parts by weight of the total amount for (A)–(D).

2. A polyester resin composition as defined in claim 1, wherein the silicone compound (E) is a dimethyl silicone oil having a viscosity of 10,000 mm$^2$/s or less as measured at 25° C. and containing 1,000 ppm or less of a low molecular weight siloxane with a molecular weight of 800 or less.

3. A polyester resin composition as defined in any one of claim 1 or 2, wherein the elastomer (C) is an ethylenic copolymer formed by copolymerizing ethylene with one or more comonomers selected from an α-olefin of 3 or more carbon atoms, an α,β unsaturated acid and an alkyl ester thereof.

4. A polyester resin composition as defined in claim 3, wherein the fibrous reinforcing material (D) is one of glass fiber and wollastonite.

5. A polyester resin composition as defined in claim 4, which is used for insert molding.

6. An insert molding product comprising the polyester resin composition as defined in claim 4.

7. A polyester resin composition as defined in claim 3, which is used for insert molding.

8. An insert molding product comprising the polyester resin composition as defined in claim 3.

9. A polyester resin composition as defined in any one of claim 1 or 2, wherein the fibrous reinforcing material (D) is one of glass fiber and wollastonite.

10. A polyester resin composition as defined in claim 9, which is used for insert molding.

11. An insert molding product comprising the polyester resin composition as defined in claim 9.

12. A polyester resin composition as defined in any one of claim 1 or 2, which is used for insert molding.

13. An insert molding product comprising the polyester resin composition as defined in any one of claim 1 or 2.

* * * * *